April 20, 1954 L. A. PHILIPP 2,675,937
REFRIGERATING CABINET
Filed July 17, 1948 2 Sheets-Sheet 1
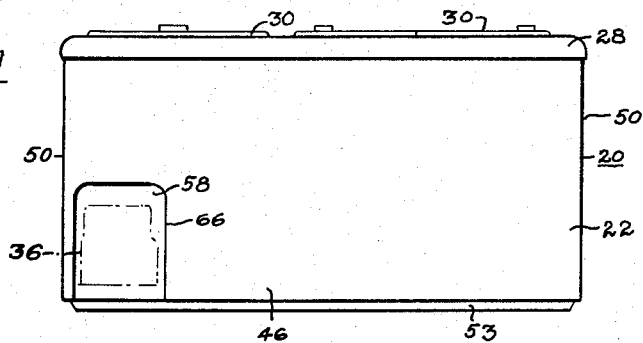
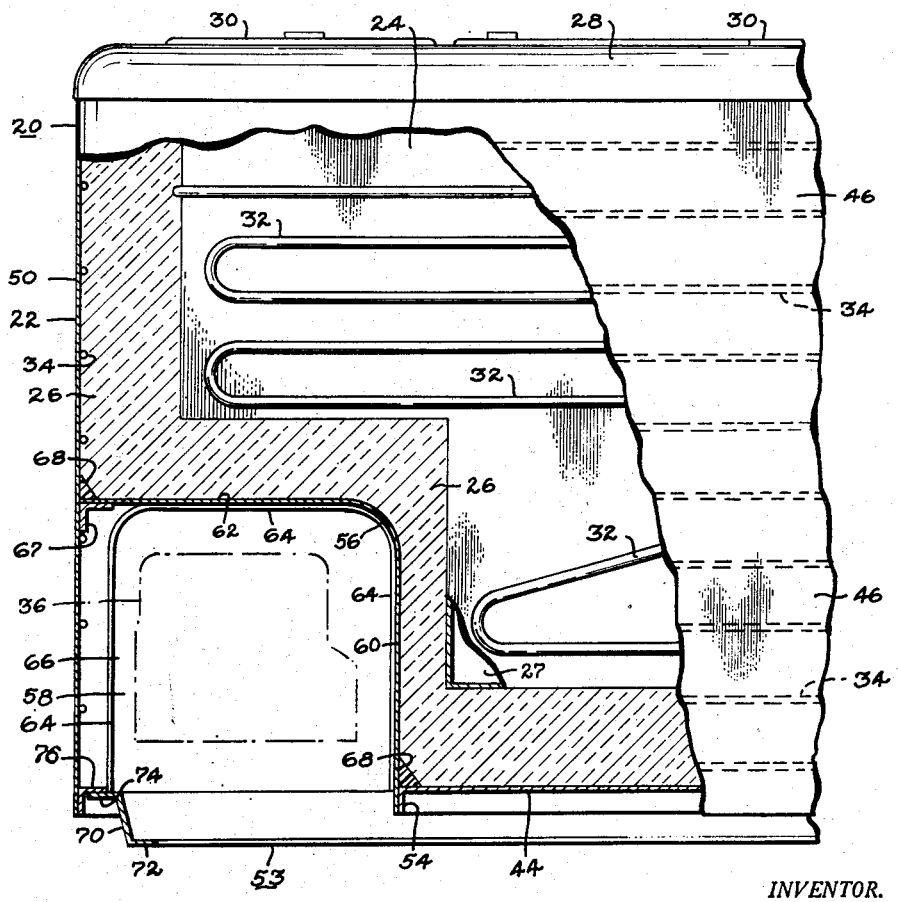
INVENTOR.
LAWRENCE A. PHILIPP
BY
Ralph E. Baker
ATTORNEY April 20, 1954      L. A. PHILIPP      2,675,937
REFRIGERATING CABINET
Filed July 17, 1948      2 Sheets-Sheet 2
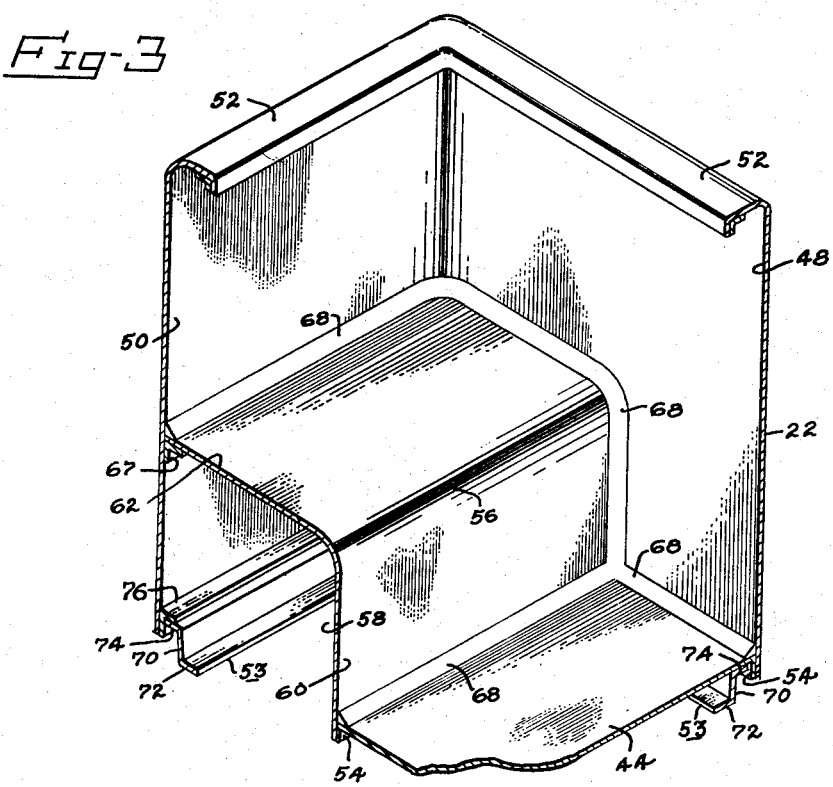
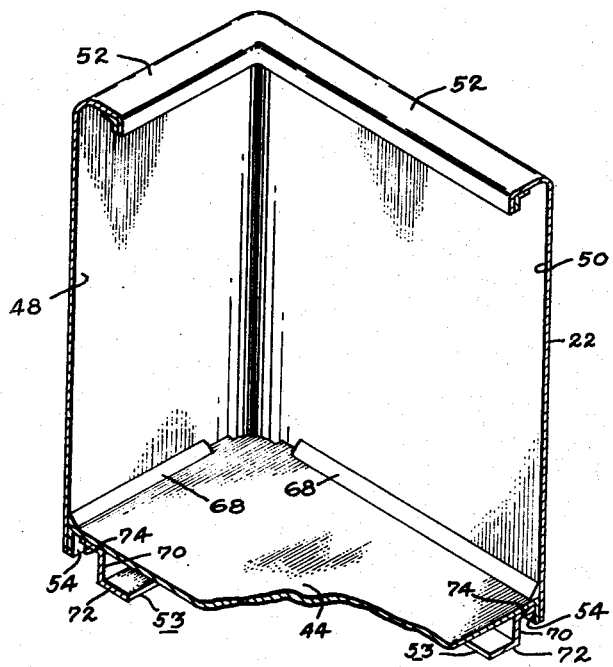
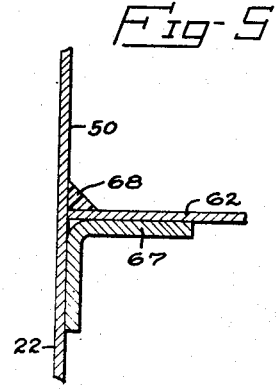
INVENTOR.
LAWRENCE A. PHILIPP
BY Ralph E. Baker
ATTORNEY Patented Apr. 20, 1954

2,675,937

UNITED STATES PATENT OFFICE 2,675,937

REFRIGERATING CABINET

Lawrence A. Philipp, Detroit, Mich., assignor to Nash-Kelvinator Corporation, Detroit, Mich., a corporation of Maryland Application July 17, 1948, Serial No. 39,300

1 Claim. (Cl. 220—4)

This invention relates generally to ice cream cabinets and more particularly to the construction of casings thereof.

Ice cream cabinets are usually fabricated by securing a bottom wall sheet metal member to upright walls formed out of another sheet metal member. In the past it has been the usual practice to form and flange these wall members in such a manner as to make it difficult to attach them together. The operation of securing the parts together either required a workman to work inconveniently within the casing to aid another workman on the outside thereof or special internal welding jigs had to be provided. In either case the operation impeded production and consequently increased cost of manufacture of ice cream cabinet casings.

Accordingly, it is an object of the present invention to provide an improved ice cream cabinet casing construction to facilitate manufacture of such cabinets, particularly with respect to the joining of the casing upright and bottom walls together along the bottom of the casing.

Another object of the invention is to construct an ice cream cabinet casing in such a manner that the upright and bottom walls may be readily secured together entirely from the outside of the casing with accompanying convenience and decrease in cost of manufacture of the cabinets.

Another object of the invention is to construct an ice cream cabinet casing such that the bottom and upright walls thereof are securable entirely from externally of the casing without loss of reinforcing benefits of the cabinet base.

Further objects and advantages of the present invention will be apparent from the following description, reference being had to the accompanying drawings, wherein a preferred form of the present invention is clearly shown.

In the drawings:

Fig. 1 is a front view of an ice cream cabinet embodying features of the present invention;

Fig. 2 is an enlarged, fragmentary front view of the cabinet having parts broken away and in section to show certain details of its construction;

Fig. 3 is an isometric, fragmentary view of a corner of the cabinet, as seen from the interior thereof;

Fig. 4 is a fragmentary, isometric view showing another corner of the cabinet as seen from the interior thereof; and Fig. 5 is a cross sectional view of the cabinet showing a detail of construction thereof.

Referring to the drawings by characters of reference, the numeral 20 designates generally a refrigerating apparatus cabinet of the type suitable for the storage of ice cream and other things to be preserved at low temperature. The cabinet 20 comprises in general, a casing 22 and a tank or liner 24. The tank 24 is located within the casing 22 in the usual, well-known manner and is preferably insulated from the casing by suitable heat insulation 26, disposed between the corresponding or adjacent walls of the casing and tank. The tank 24 forms a storage compartment 27 for ice cream, package goods, etc. which may be cooled by any suitable refrigerating system, such as the system shown in my Patent No. 2,302,051. Access may be had to the storage compartment 27 through openings in a top wall 28 of the cabinet, the openings being closable by readily removable closure members or lids 30.

In the present disclosure, a refrigerant evaporator 32 is attached in good heat exchange relationship to the outer wall surface of the tank 24 so as to absorb heat therefrom efficiently. The refrigerant evaporator 32 may be in the form of a sinuous coil or conduit which may be arranged to extend over a large or lesser part of the tank surface, as may be desired. The numeral 34 designates generally, a refrigerant condenser coil for connection to the evaporator 32 and to a refrigerant motor-compressor unit 36 in the manner set forth in the above identified patent. The present arrangement of the condenser coil 34 differs from that shown in the patent in being secured to the inner surface of the casing 22 so as to use the large casing surface for efficient dissipation of the heat of condensation to atmosphere. Any of the well-known suitable cements or other suitable securing means may be used to secure the refrigerant condenser coil 34 in good heat transfer relationship with the casing.

The casing 22 comprises, a bottom wall 44, and upright walls including a front wall 46, rear wall 48 and end walls 50. Preferably the casing 22 is made of sheet material, such as sheet steel. Around its upper edge, the casing 22 may be formed with an inturned reinforcing flange 52 to support the cabinet top 28. A base 53 supports the cabinet, the bottom wall of the casing 22 seating on and preferably being secured to the base by welding.

In accordance with my invention, I secure the base 53 to the casing bottom wall to support and reinforce the same adjacent the outer edge thereof near which I form the casing bottom wall with a downturned reinforcing flange 54 which is secured to the casing upright walls entirely from externally of the casing. The casing bottom wall flange 54 is positioned flat against the inner surfaces of the casing upright walls and extends along one of the end walls 50 and partway along the casing front and rear walls, above and adjacent the bottom edges thereof. At one end of the casing 22, the bottom wall 44 thereof has an offset 56 for clearance or to form a compartment 58 for the refrigerant motor-compressor unit 36. This offset may be formed of a separate sheet of metal, as in the present construction, or may be formed out of the bottom wall proper 44. The bottom wall offsetting member 56 has a vertical leg 60 and a horizontal leg 62 which may extend entirely across the width of the casing between the front and rear walls thereof. Opposite ends of the members 56 may respectively seat on and be welded to inturned flanges 64, formed on the casing front and rear walls 46, 48 respectively. The flanges 64 extend around openings 66 which are provided in the casing front and rear walls to give access to the motor-compressor compartment 58. Adjacent the lower edge of the leg 60, the downturned flange 54 of the bottom wall proper 44 is welded flat thereagainst which operation may be accomplished entirely from beneath or externally of the casing. The horizontal leg 62 of the wall member 56 extends to the adjacent casing end wall where the member 56 is welded to an angle member 67 which is in turn welded to the casing end wall. If desired, the joints between the casing upright walls, the casing bottom wall 44, and the bottom wall offsetting member 56 may be sealed by any suitable sealing material 68, such as a mastic or bituminous cement.

The cabinet base 53 may be of general rectangular shape having horizontal front, rear and end members rigidly joined together, such as by welding. These frame members are Z-shape in cross section, each comprising an upright web 70, a lower base flange 72 and an upper, casing seating flange 74. The upper flange 74 is outturned and supports the casing bottom wall 44, adjacent the bottom wall downturned flange 54. At the end of the casing 22, adjacent the motor-compressor compartment 58, a support 76 which may be an angle member is welded to the inner surface of the casing end wall to reinforce this wall and to provide an enlarged horizontal seating surface to rest on the base flange 74. In constructing the cabinet, the casing bottom wall 44, base 53 and angle member 76 are welded together prior to assembly with the casing upright walls.

From the foregoing description, it will now be understood that I have provided an improved cabinet casing construction in which the casing upright and bottom walls are formed and arranged to facilitate their being welded together. It will also be understood that by providing said bottom wall with a downturned flange and extending the upright walls downwardly to overlie said flange, that these parts are readily accessible to be welded together entirely from outside of the casing. In addition, I have provided an ice cream cabinet casing whose upright and bottom walls are secured together entirely from externally of the casing and have arranged a Z-shaped cabinet base which while being spaced from said flange so as to allow free access to the securing of the flange and walls together nevertheless supports and may be welded to the bottom wall adjacent the upright walls.

Although only a preferred form of the invention has been illustrated, and that form described in detail, it will be apparent to those skilled in the art that various modifications may be made therein without departing from the spirit of the invention or from the scope of the appended claim.

I claim:

In a refrigerator cabinet, a sheet material wall structure having side and end walls, a base and bottom wall structure to position within and be secured to the side and end walls comprising, a rectangular base member of Z-shape cross section having an upper outturned seat and a lower inturned support along its ends and sides, an angle member having one leg thereof secured flat against the outturned seat along one end of the base and having a downturned flange arranged to position flat against one end wall of the wall structure adjacent the lower edge thereof, a rectangular bottom wall member having downturned flanges along the sides and ends thereof, one of the bottom wall end flanges and the opposite side flanges positioned for respectively engaging the inner surfaces of the corresponding end and side walls of said wall structure, an angle member having one leg extending upwardly from the other of the bottom wall flanges and another leg extending horizontally to said one end wall of the wall structure above said first angle member to form a machinery compartment, said base, bottom wall and first angle member being secured together prior to assembly with the wall structure, and means securing the downturned flanges of said first angle member and of said bottom wall member to the corresponding side and end walls of said wall structure and the second angle member to the other of the bottom wall flanges and to said one end wall of the wall structure.

References Cited in the file of this patent

UNITED STATES PATENTS

| Number | Name | Date |
|---|---|---|
| 1,365,527 | Mittinger | Jan. 11, 1921 |
| 1,740,000 | Andrews et al. | Dec. 17, 1929 |
| 1,793,118 | Moores | Feb. 17, 1931 |
| 1,885,441 | Herbolsheimer | Nov. 1, 1932 |
| 1,915,903 | Schroeder et al. | June 27, 1933 |
| 1,955,816 | Lemont | Apr. 24, 1934 |
| 2,056,820 | Bradley | Oct. 6, 1936 |
| 2,098,577 | Gredell | Nov. 9, 1937 |
| 2,121,269 | Sisson | June 21, 1938 |
| 2,162,361 | Sisson | June 13, 1939 |
| 2,242,155 | Uline | May 13, 1941 |
| 2,252,865 | Schaefer | Aug. 19, 1941 |
| 2,622,753 | Philipp | Dec. 23, 1952 |